(12) United States Patent
Kimijima et al.

(10) Patent No.: US 10,753,889 B2
(45) Date of Patent: Aug. 25, 2020

(54) CELL FOR X-RAY ANALYSIS AND X-RAY ANALYSIS APPARATUS

(71) Applicant: Inter-University Research Institute Corporation High Energy Accelerator Research Organization, Tsukuba-shi, Ibaraki (JP)

(72) Inventors: Ken'ichi Kimijima, Tsukuba (JP); Masao Kimura, Tsukuba (JP); Daiji Asahara, Osaka (JP); Yasuhiro Onishi, Osaka (JP)

(73) Assignee: INTER-UNIVERSITY RESEARCH INSTITUTE CORPORATION HIGH ENERGY ACCELERATOR RESEARCH ORGANIZATION, Tsukuba-shi (JP)

( * ) Notice: Subject to any disclaimer, the term of this patent is extended or adjusted under 35 U.S.C. 154(b) by 126 days.

(21) Appl. No.: 16/189,004

(22) Filed: Nov. 13, 2018

(65) Prior Publication Data

US 2019/0145915 A1    May 16, 2019

(30) Foreign Application Priority Data

Nov. 14, 2017 (JP) ................................. 2017-219102

(51) Int. Cl.
*G01N 23/20033* (2018.01)
*G01N 23/2055* (2018.01)
*G01N 23/085* (2018.01)

(52) U.S. Cl.
CPC ..... *G01N 23/20033* (2013.01); *G01N 23/085* (2018.02); *G01N 23/2055* (2013.01)

(58) Field of Classification Search
CPC ........... G01N 23/20033; G01N 23/085; G01N 23/2055
See application file for complete search history.

(56) References Cited

PUBLICATIONS

Kimijima et al. "Development of in situ cell for simultaneous XAFS/XRD measurements at high temperatures". Radiation Physics and Chemistry. Available online Feb. 2, 2019, 108153. (Year: 2019).*

\* cited by examiner

*Primary Examiner* — Michael C Bryant
(74) *Attorney, Agent, or Firm* — Westerman, Hattori, Daniels & Adrian, LLP

(57) ABSTRACT

Provided are a cell for X-ray analysis and an X-ray analysis apparatus that enable simultaneous X-ray diffraction and X-ray absorption fine structure measurements of a material (sample) in the same field of view on the sample (same position on the sample). The cell for X-ray analysis of the present invention enables simultaneous X-ray diffraction and X-ray absorption fine structure measurements of a sample in the same field of view on the sample and includes a furnace including a space where the sample is held and a focused heater heating the sample, a first window provided to the furnace and through which X-rays directed at the sample is incident, a second window provided to the furnace and from which X-rays emerging from the sample exit, a third window provided to the furnace, and a holder that positions the sample in the space. The cell for X-ray analysis makes it possible to simultaneously measure X-ray diffraction of the sample at outside of the second window and X-ray absorption fine structure of the sample through the third window.

8 Claims, 10 Drawing Sheets

CELL FOR X-RAY ANALYSIS AND X-RAY ANALYSIS APPARATUS

BACKGROUND OF THE INVENTION

Field of the Invention

The present invention relates to measurement of changes in structure and chemical state of a material, and more specifically to a cell for X-ray analysis and an X-ray analysis apparatus that enable simultaneous X-ray diffraction (XRD) and X-ray absorption fine structure (XAFS) measurements of the material in the same field of view on the material.

Description of the Related Art

As disclosed in Japanese Patent Laid-Open No. 11-132977 and the like, X-ray diffraction is a technique in which a substance is irradiated with X-rays to obtain and analyze its diffraction pattern (hereinafter referred to also as an XRD pattern), and thereby to determine the crystal structure. On the other hand, as disclosed in Japanese Patent Laid-Open No. 2017-053826 and Japanese Patent Laid-Open No. 2006-162506, X-ray absorption fine structure measurement is a technique in which a substance is irradiated with X-rays to obtain information including electronic state of the atom absorbing X-rays and its peripheral structure (a distance to the neighboring atoms and the number thereof) based on the transmittance (X-ray absorption spectrum (hereinafter, referred to also as XAFS spectrum)).

However, neither a cell for X-ray analysis that makes it possible to simultaneously measure X-ray diffraction and X-ray absorption fine structure of a material at ultra-high temperature, nor an X-ray analysis apparatus that simultaneously measures X-ray diffraction and X-ray absorption fine structure of the material at ultra-high temperature in the same field of view (same position) on the material using the cell for X-ray analysis have been known.

This is primarily because the optical system for XAFS measurement requires point (zero-dimensional) detection, whereas the optical system for XRD measurement requires line or plane (one- or two-dimensional) detection. Although different detectors and optical arrangements are required, it is extremely difficult to achieve the compatibility between these optical systems and the temperature rise to ultra-high temperature in the sample (holding, heating, and the nal insulation of the sample and cooling of the vessel), and thus its method has not been provided.

In particular, ultra-high temperature heating requires covering the furnace with a thermal insulating material, raising the degree of vacuum inside, and preventing heat from being transferred to the outside, and thus, there have been various limitations on the position, size, and material of the windows. For example, in order to heat a sample to an ultra-high temperature and to measure XAFS and XRD, it has been necessary to provide to a furnace, X-ray transmitting windows corresponding to respective two different types of measurements in addition to heating the sample. Moreover, there has not been sample holding means that makes it possible to combine ensuring a practical heating rate and providing the windows.

Further, by a method of separately measuring X-ray diffraction and X-ray absorption fine structure as in the conventional method, it has been practically impossible to measure the same point being a micro area. The same point cannot be separately measured, and thus, it has been not possible to evaluate irreversible reactions locally occurring in the micro area.

The present invention aims at providing a cell for X-ray analysis and an X-ray analysis apparatus that enable simultaneous X-ray diffraction and X-ray absorption fine structure measurements of a material (sample) in the same field of view on the sample.

SUMMARY OF THE INVENTION (1) A cell for X-ray analysis that enables simultaneous X-ray diffraction and X-ray absorption fine structure measurements of a sample in the same field of view on the sample, including:

a furnace including a space where the sample is held and a focused heater heating the sample;

a first window provided to the furnace and allowing passage of incident X-rays directed at the sample;

a second window provided to the furnace and allowing passage of exiting X-rays emerging from the sample;

a third window provided to the furnace; and a holder configured to position the sample in the space, the cell enabling simultaneous measurements of the X-ray diffraction of the sample, at outside of the second window and the X-ray absorption fine structure of the sample, through the third window.

(2) The cell for X-ray analysis according to (1) described above, wherein the holder is insertable to and removable from the furnace.

(3) The cell for X-ray analysis according to (1) described above, wherein the furnace includes a flow path where a fluid for cooling the furnace flows.

(4) The cell for X-ray analysis according to (1) described above, including a gas injection portion in communication with the space, for filling the space with gas or letting the gas to flow in the space and a gas outlet for discharging the gas.

(5) The cell for X-ray analysis according to (1) described above, wherein the sample is heated at ultra-high temperature of 1000° C. or higher for measurement.

(6) The cell for X-ray analysis according to (1) described above, wherein the holder includes a stage positioned in the space, for mounting the sample, a hollow rod connected to the stage, an adapter connected to the rod at side opposing the stage and fitted to the furnace, and a thermocouple arranged inside the rod and connected to the stage, the stage being rotatable together with the rod and acting as a hot junction of the thermocouple.

(7) The cell for X-ray analysis according to (1) described above, wherein the space has a shape obtained by combining two spheroids in their rotation axis, the two spheroid each having two focal points on its rotation axis and sharing one focal point with one another, the space including on its inner surface a mirror for reflecting infrared rays, the space, in which the sample is located at the shared focal point, and infrared lamps of a first heating device and a second heating device being the focused heater are located at another respective focal point which is not shared.

(8) An X-ray analysis apparatus including the cell for X-ray analysis according to any one of 1 to 7 described above, an X-ray diffraction detector, and a detector for X-ray absorption fine structure measurement, the X-ray analysis apparatus simultaneously measuring X-ray diffraction and X-ray absorption fine structure.

Owing to above configuration, the present invention makes it possible to simultaneously measure X-ray diffraction and X-ray absorption fine structure of a material (sample) in the same field of view on the material (same position on the sample). In measurements, it is possible to heat the sample at temperature ranging from room temperature (e.g., 20° C.) to ultra-high temperature within the heat resistance limit of the apparatus (e.g., 1000° C. or higher, 1500° C. or higher, and further 1800° C. or higher). In addition, it is also possible to cool the cell, or to inject gas to placement space for the sample. Moreover, the sample can be adiabatically inserted in, removed from, and placed in the placement space for the sample using the holder, and it is therefore easy to place and exchange the sample.

Furthermore, providing cooling function to a furnace 2 allows a first window 6 to be located closer to the sample. Yet furthermore, the placement space for the sample is filled with gas and the gas flows therein, thereby making it possible to simultaneously measure X-ray diffraction and X-ray absorption fine structure at high temperature in a state where a specific minute site of the sample is irradiated with X-rays while the gas atmosphere to which the sample is subjected and the temperature of the sample are maintained, which has conventionally been difficult to achieve.

DETAILED DESCRIPTION OF THE PREFERRED EMBODIMENT

Figure 1A:
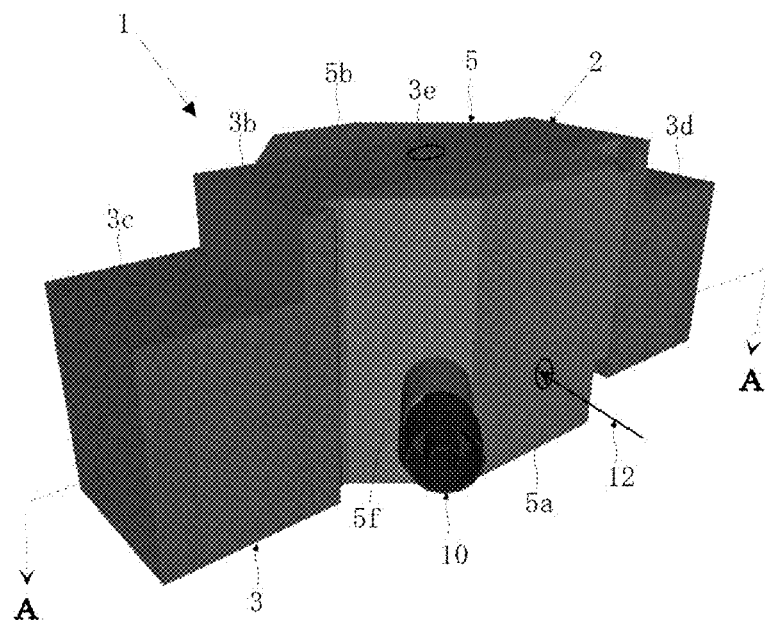
FIGS. 1(A) and 1(B) are respectively a front-left perspective view and a front-right perspective view schematically depicting a cell for X-ray analysis of the present invention.
Figure 1B:
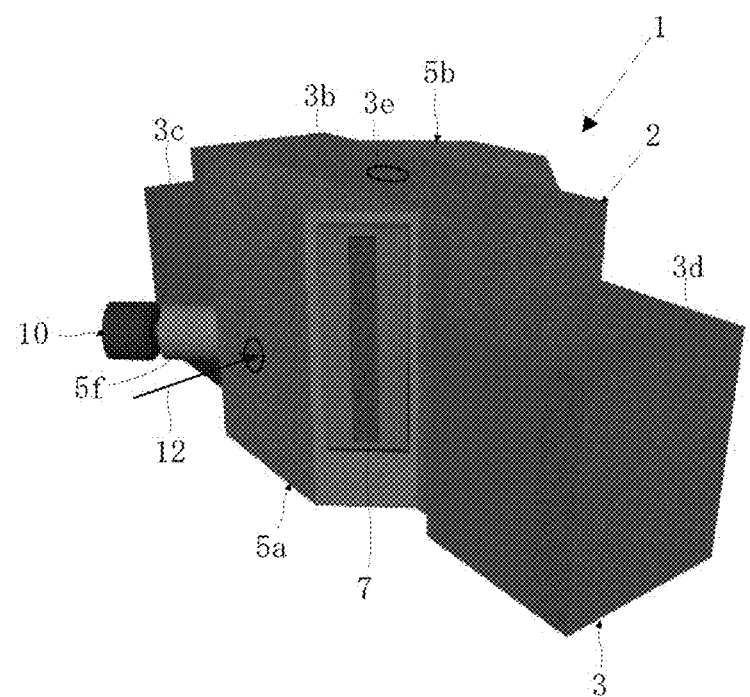
Figure 2A:
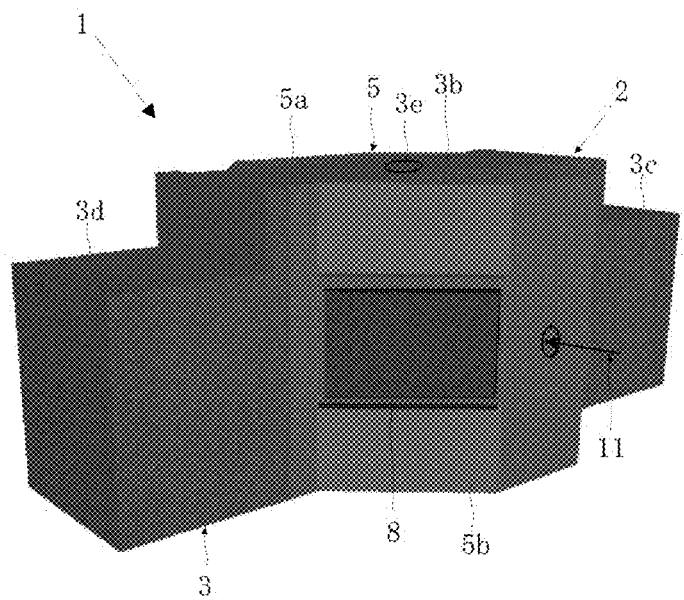
FIGS. 2(A) and 2(B) are respectively rear-left perspective view and rear-right perspective view schematically depicting the cell for X-ray analysis of the present invention.
Figure 2B:
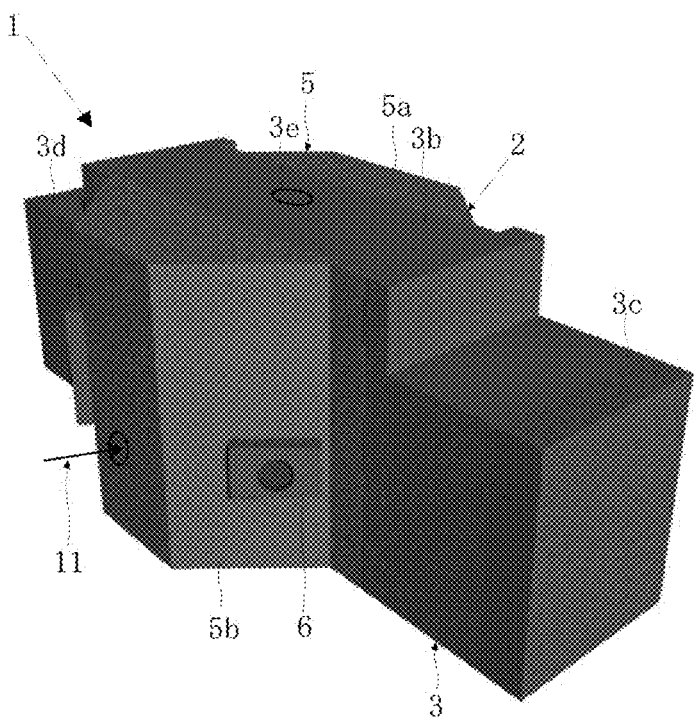

Hereinafter, embodiments of the present invention will be described in detail with reference to the accompanying drawings. Note that, the present invention is not limited to the following embodiments.

Embodiments

<Cell for X-Ray Analysis>

As shown in FIGS. 1 to 5, a cell for X-ray analysis 1 of the present invention includes a furnace 2, a first window 6, a second window 7, and a third window 8 which are provided to the furnace 2, and a holder 10 that positions a sample 20 in a space 3a inside the furnace 2. The cell for X-ray analysis 1 enables simultaneous measurements of X-ray diffraction and X-ray absorption fine structure of the sample 20 (material) in the same field of view on the sample 20.

The furnace 2 herein includes a heating section 3, and a first block 5a and a second block 5b which are fitted and connected to the heating section 3 and on which the windows 6 to 8 are installed. The first block 5a and the second block 5b form a window holding section 5.

The heating section 3 includes a vessel 3b having the space 3a in which the sample 20 is held, a first heating device 4a and a second heating device 4b that heat the sample 20 by setting their focal points at the sample 20 while opposing to each other across the sample 20 on a straight line, and a first base 3c and a second base 3d that respectively hold the first heating device 4a and the second heating device 4b and that are fitted to the vessel 3b. Note that, each of the first and second heating devices 4a and 4b is a focused heater (e.g., lamp type infrared condensing heater).

Figure 3:
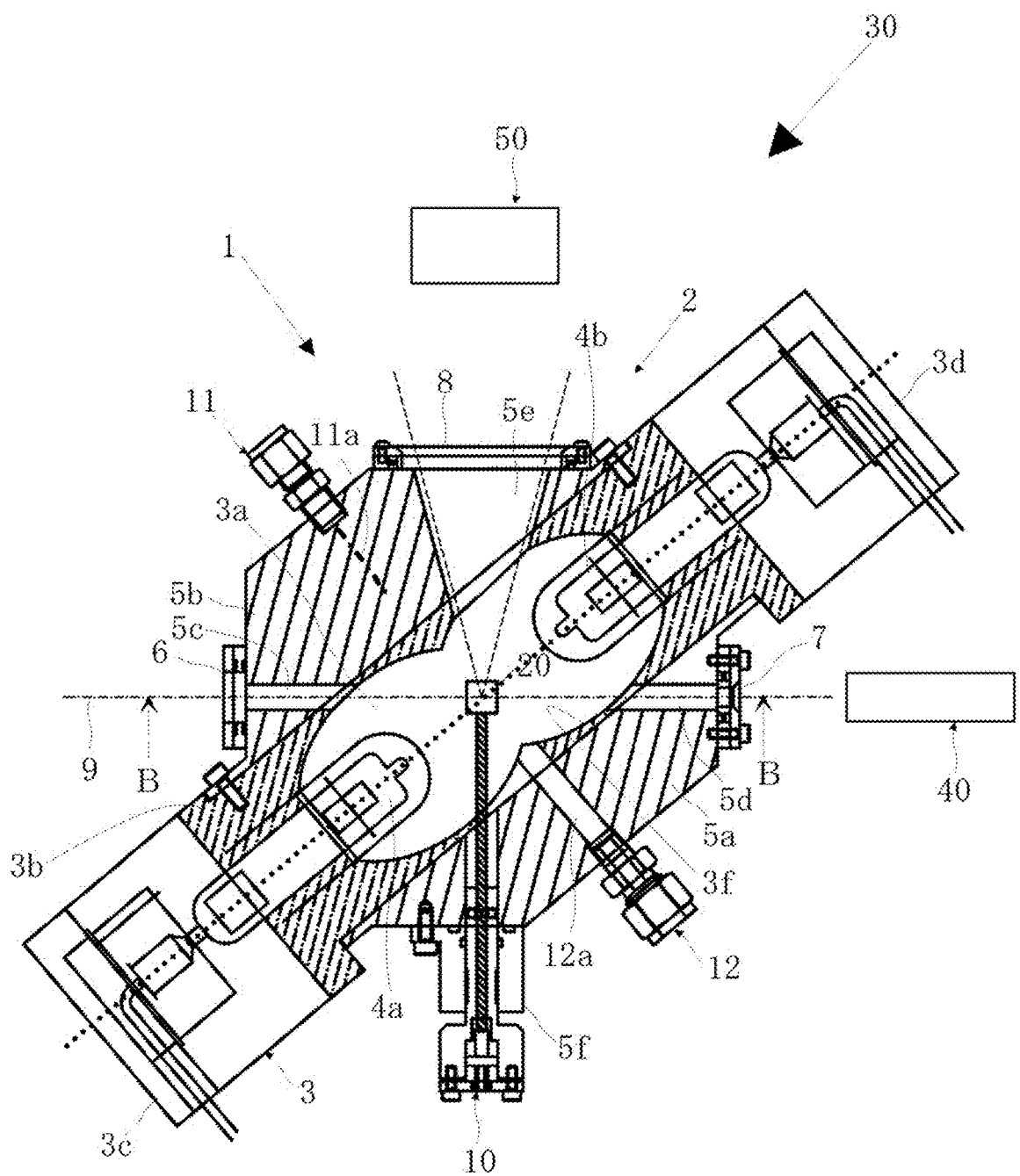
FIG. 3 is a view illustrating a configuration of an X-ray analysis apparatus of the present invention and also shows a cross-sectional view of the cell for X-ray analysis taken along line A-A of FIG. 1(A)

Each component is bolted, etc., and an O-ring is interposed between each component to ensure airtightness. The space 3a has such a shape that two spheroids with their rotation axis shown as a dotted line in FIG. 3 are combined in the rotation axis direction, and two spheroid each has two focal points on its rotation axis and shares one focal point with the other spheroid. In addition, the space 3a includes on its inner surface a mirror 3f that reflects infrared rays. The sample 20 is located at the shared focal point, and infrared lams of the first and second heating devices 4a, 4b being the focused heaters are located at the other respective focal points which are not shared. Each of the first and second bases 3c, 3d preferably includes a cooling function, such as fluid circulation, or air blow of a fan.

As illustrated in FIG. 3 in detail, the first window 6 herein is a window that is provided at an outer end of a through-hole 5c communicating outside of a side surface of the second block 5b and the space 3a and that allows passage of incident X-rays directed at the sample 20. The first window 6 should be sized to allow the X-rays to reach a sample, and the diameter of the X-ray beam in this embodiment is 20 μm, so that the first window 6 is to have a size of 8 mm considering the efficiency of positioning work for an optical axis 9. Note that, the diameter of the beam depends on the beam line to be used and its setting.

As a common matter of all the windows 6-8, although it is basically preferred for the windows to have bigger sizes, the area of the mirror 3f decreases as the size of the window increases, and consequently the temperature raising efficiency is reduced.

The second window 7 herein is a window that is provided at an outer end of a second slit 5d communicating outside of a side surface of the first block 5a and the space 3a and that allows passage of exiting X-rays emerging from the sample 20, thereby making it possible to measure the X-ray diffraction of the sample 20 by an X-ray diffraction detector 40 positioned outside the second window 7 in the travelling direction of the X-rays along the optical axis 9 being the optical path of the X-rays. The second window 7 preferably has a rectangular shape or a cylindrical shape with a narrow width, for example, so that its angle of view can be large in a direction of the diffraction angle of X-rays diffracted by the sample 20.

Figure 4:
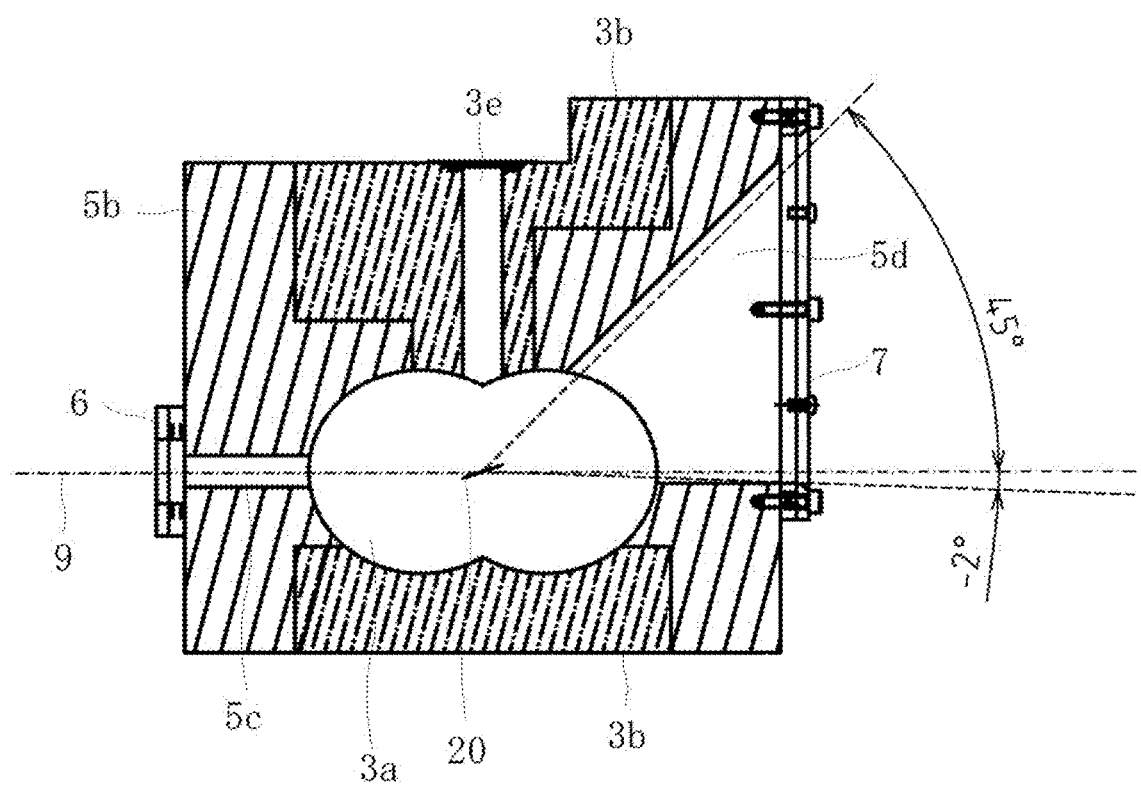
FIG. 4 is a cross-sectional view of the cell for X-ray analysis taken along line B-B of FIG. 3.

As illustrated in FIG. 4, the slit 5d is formed with a groove in a range from 45° upward from the optical axis 9 to 2° downward from the optical axis 9 with the sample 20 as the center. The first window 6 and the second window 7 are on the optical axis 9, and the sample 20 also is placed on the optical axis 9. In addition, decreasing the width of the slit 5d reduces influence of X-ray scattering unnecessary for X-ray analysis measurements.

The third window 8 herein is a window that is provided at an outer end of a channel 5e communicating outside of the side surface of the second block 5b and the space 3a. The third window 8 enables the sample 20 to be viewed therethrough and the detector for X-ray absorption fine structure measurement 50 to measure X-ray absorption fine structure of the sample 20. The channel 5e is a space having a shape of a quadrangular prism with the sample 20 being as its apex and the third window 8 of a square shape being its bottom surface. When the third window 8 is located in the direction of 90° in the plane relative to the optical axis 9, the highest measurement accuracy is ensured (S/N ratio (S/B ratio) is improved). Note that the third window 8 may have a solid angle at which the sample 20 is seen, considering a light-receiving area of the detector for X-ray absorption fine structure measurement 50.

Figure 5:
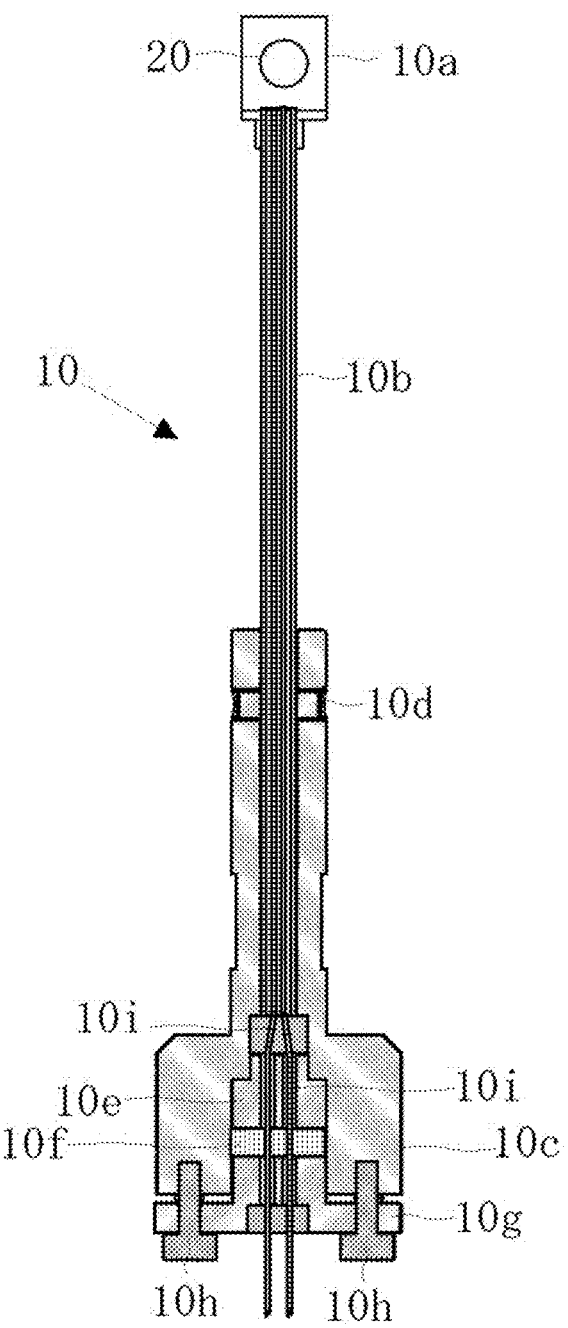
FIG. 5 is a partial plan cross-sectional view of a holder.

As illustrated in FIG. 5 in detail, the holder 10 includes a stage 10a for mounting the sample 20, a rod 10b connected to the stage 10a, an adapter 10c into which the rod 10b is inserted, an O-ring 10d for ensuring airtightness between the adapter 10c and the rod 10b, a jig 10e fitted to a groove in an end of the side opposite to the stage 10a in the adapter 10c, a packing 10f which is in contact with the jig 10e to ensure airtightness of the space 3a, a gland 10g sandwiching the packing 10f together with the jig 10e to apply pressure on the packing 10f, screws 10h causing the gland 10g to apply pressure on the packing 10f and fixing the gland 10g to the adapter 10c, and a thermocouple 10i connected to the stage 10a through inside the rod 10b, inserted to holes of the adapter 10c, jig 10e, packing 10f, and gland 10g, and connected to an external temperature indicator to measure the temperature of the sample 20.

For example, the rod 10b is made of alumina, and accordingly the sample 20 can be heated while being held in a space on the optical axis 9 and preventing heat dissipation due to thermal conduction. In addition, the material of the rod 10b is not particularly limited and can be a material other than alumina, so long as the material is durable under use conditions and has a low thermal conductivity.

On the other hand, the material of the stage 10a is not particularly limited, so long as the material is durable in a use environment. The stage 10a made of platinum is used in the embodiment below. By connecting a Pt wire and a Pt—Rh wire, it is possible to more accurately measure the temperature of the stage 10a, and consequently the temperature of the sample 20, by the stage 10a itself acting as the hot junction of the thermocouple 10i.

The holder 10 thus formed is insertably and removably fitted to a receiver 5f of the first block 5a and positions the sample 20 in the space 3a adiabatically and rotates the adapter 10c to rotate the stage 10a, and consequently the sample 20, thereby adjusting and holding an optimal incident angle of X-rays that achieves simultaneous measurements of XAFS and XRD.

The holder 10 is positioned at the focal point of the infrared condensing heaters to heat the sample 20, thereby reducing thermal loads on the windows 6-8. Accordingly, a material which is sensitive to high temperatures, such as a polyimide film (Kapton (registered trademark)) can be also used as a window material, instead of window materials on which only limited experiments can be performed, such as beryllium, boron nitride crystals, and the like. Furthermore, forming the stage 10a into a plate shape allows the sample 20 to be used for an X-ray analysis measurement without requiring any special pretreatment other than cutting the sample 20.

Moreover, the furnace 2 is perforated to form a flow path 11a (only partially shown) through which a fluid for cooling the furnace 2 passes in order to protect the furnace 2 from heat due to heating of the sample 20. In addition, a fluid injection portion 11 in communication with the flow path 11a is provided on the side surface of the second block 5b herein. Note that, a drain for the fluid can be connected to the flow path 11a in a desired position and is not illustrated herein. Cooling the furnace 2 and mounting the sample 20 on the stage 10a enable the X-ray analysis of the sample 20 at higher temperatures.

Also, the furnace 2 includes a gas injection portion 12 for filling the space 3a with gas or letting the gas to flow in the space 3a and a gas outlet (not shown) for discharging the gas (a service port 3e that can access the space 3a and can be used in adding function or the like at a later date may be used as the gas outlet). The gas injection portion 12 herein is provided at an outer end of a through-hole 12a communicating outside the side surface of the first block 5a and space 3a. This configuration makes it possible to control a vacuum in the space 3a to the gas atmosphere, and further to perform X-ray analysis including the chemical reaction of the sample 20 at a high temperature (e.g., 1500° C. or higher) in the gas atmosphere.

In order to simultaneously measure XAFS and XRD at ultra-high temperature in the same position on the sample, it has been necessary to provide the windows for XAFS and XRD measurements in addition to heating the sample. However, according to an extension of the conventional technique, in order to heat the sample at ultra-high temperature, it is required to go through a thermal insulation process so as not to conduct heat of a heater to outside of the cell for X-ray analysis, and thus it has not been possible to provide the windows for measurements.

On the other hand, in the present invention, the focused heaters (first and second heating devices 4a, 4b) and the holder 10 are used, thereby mitigating the thermal insulation process on the cell for X-ray analysis 1, and consequently the second window 7 and the third window 8 can be provided to the furnace 2.

Moreover, the second window 7 and the third window 8 can be provided in respective positions that assure optical systems necessary for the simultaneous XAFS and XRD measurements in the same position on the sample. As a result, it is possible to simultaneously measure the XAFS and XRD in the same position on the sample.

With positions and shapes of the second window 7 and the third window 8 according to the present invention, measurements of the XAFS and XRD do not interfere with each other, and thus highly accurate measurements are enabled.

<X-Ray Analysis Apparatus>

As illustrated in FIGS. 3, 4, an X-ray analysis apparatus 30 of the present invention includes the cell for X-ray analysis 1, an X-ray diffraction detector 40 that is positioned outside the second window 7 and detects X-rays diffracted by the sample 20, and a detector for X-ray absorption fine structure measurement 50 that is positioned behind the third window 8 and detects an X-ray absorption spectrum of the sample 20 irradiated with X-rays.

By Irradiating the sample 20 with X-rays, it is possible to simultaneously measure the X-ray diffraction and X-ray absorption fine structure of the same site of the same sample 20.

For the X-ray diffraction detector 40, an existing commercially available detector used for detecting X-ray diffraction, such as a proportional counter, a CCD detector, or an imaging plate may be used. For the detector for X-ray absorption fine structure measurement 50, also an existing commercially available detector, such as a Lytle detector for fluorescence XAFS, a silicon drift detector for fluorescence XAFS, or a 19-element Ge-SSD may be used <Measurement Procedure>

Although X-rays to be used herein can be synchrotron radiation or X-rays from laboratory X-ray generator (e.g., X-ray tube), synchrotron radiation is desirable for the XAFS measurement. The cell for X-ray analysis 1 is positioned such that X-rays are emitted along the optical axis 9.

The sample 20 is placed on the stage 10a. The holder 10 is rotated such that the sample 20 is placed within the optical axis 9 of X-rays. In addition, the angle between the sample 20 and incident X-rays is set using the holder 10 to achieve both of XRD and XAFS.

The sample 20 is irradiated with infrared rays emitted by the first and second heating devices 4a, 4b to be heated. The holder 10 is adiabatically held by the rod 10b made of ceramic, such as alumina. The sample 20 is heated by infrared irradiation, thereby reducing heat loss.

A fluorescence detector is provided in a direction perpendicular to the optical axis 9 of X-rays in a plane (preferably 90° in the horizontal plane direction, but not limited thereto) to measure XAFS. An angle-resolved detector (one- or two-dimensional X-ray detector, or an X-ray detector provided to a goniometer, hereinafter, referred to as angle-resolved detector or the like) is provided in a direction perpendicular to the optical axis 9 in the vertical plane to measure XRD.

The sample 20 is irradiated with X-rays through the first window 6.

Fluorescence X-ray emitted from the sample 20 is detected by the fluorescence detector through the third window 8, thereby measuring XAFS spectrum. On the other hand, X-rays diffracted in a direction of the optical axis 9 are detected using the angle-resolved detector, or the like through the second window 7, thereby measuring XRD.

A technology to simultaneously measure the same field of view is necessary for measuring and evaluating from heterogeneous reaction to a locally progressing change. Moreover, separate measurements are meaningless when irreversible change is caused due to heating and the like.

<Measurement Result>

Hereinafter, a sintered body of $Yb_2Si_2O_7$ (8×8×0.5 mm) was used as the sample 20 and heated at a set temperature of 1500° C. to measure XRD and XAFS.

Figure 6:
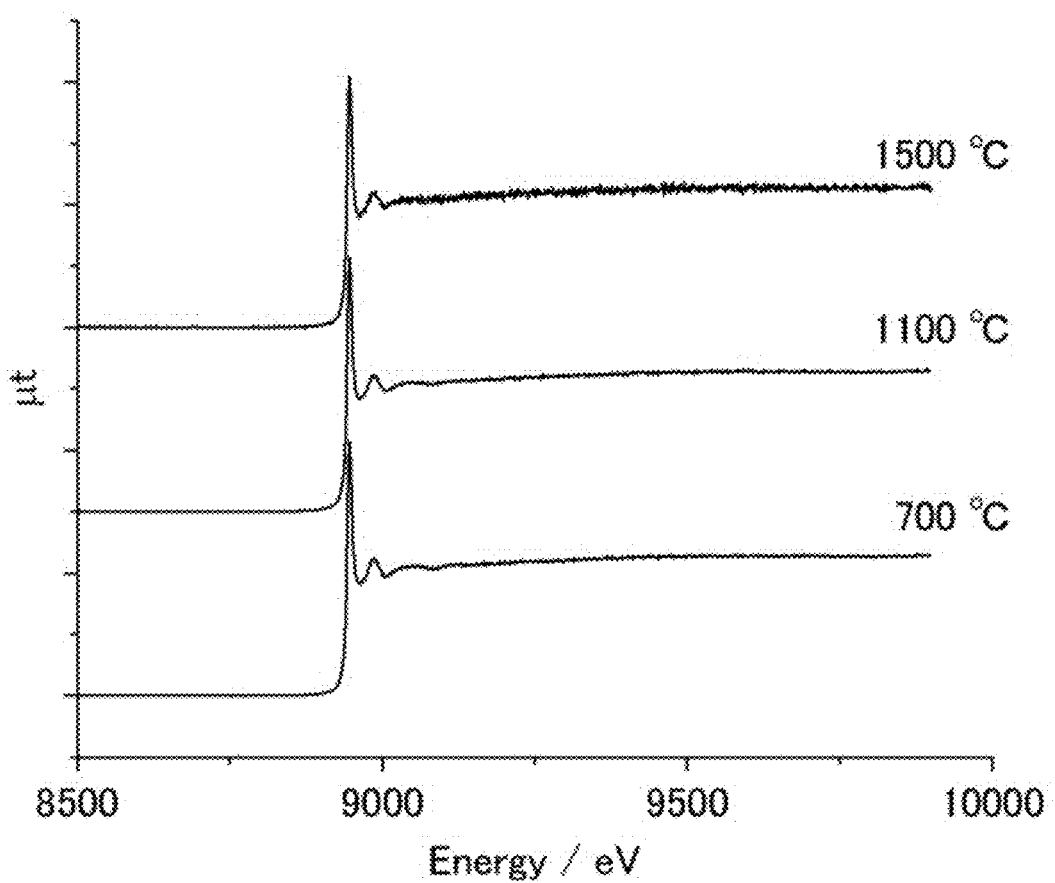
FIG. 6 is a graph showing XAFS spectra of a sample, a sintered body of $Yb_2Si_2O_7$, measured at 700° C., 1100° C., and 1500° C.

FIG. 6 is a graph showing XAFS spectra of the sample, the sintered body of $Yb_2Si_2O_7$, measured at 700° C., 1100° C., and 1500° C. Yb LIII absorption edge can be observed at about 8.9 keV. Note that, in FIG. 6, energy (eV) is plotted on the horizontal axis, and normalized absorbance (μt) is plotted on the vertical axis.

Figure 7:
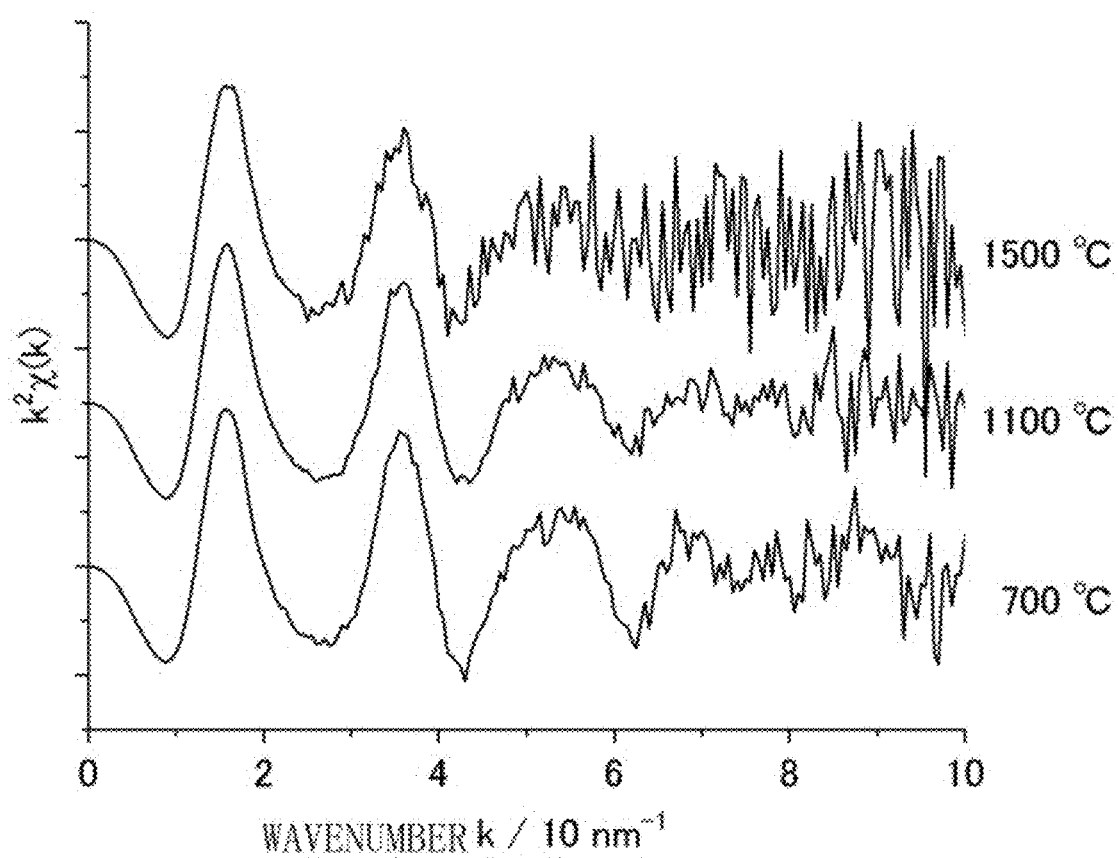
FIG. 7 is a graph showing XAFS oscillation spectra extracted from the XAFS spectra of FIG. 6.

FIG. 7 is a graph showing XAFS oscillation spectra extracted from the XAFS spectra of FIG. 6. It is clearly observed that the oscillation intensity changes as the temperature rises. Note that, in FIG. 7, wavenumber is plotted on the horizontal axis, and oscillation intensity is plotted on the vertical axis.

Figure 8:
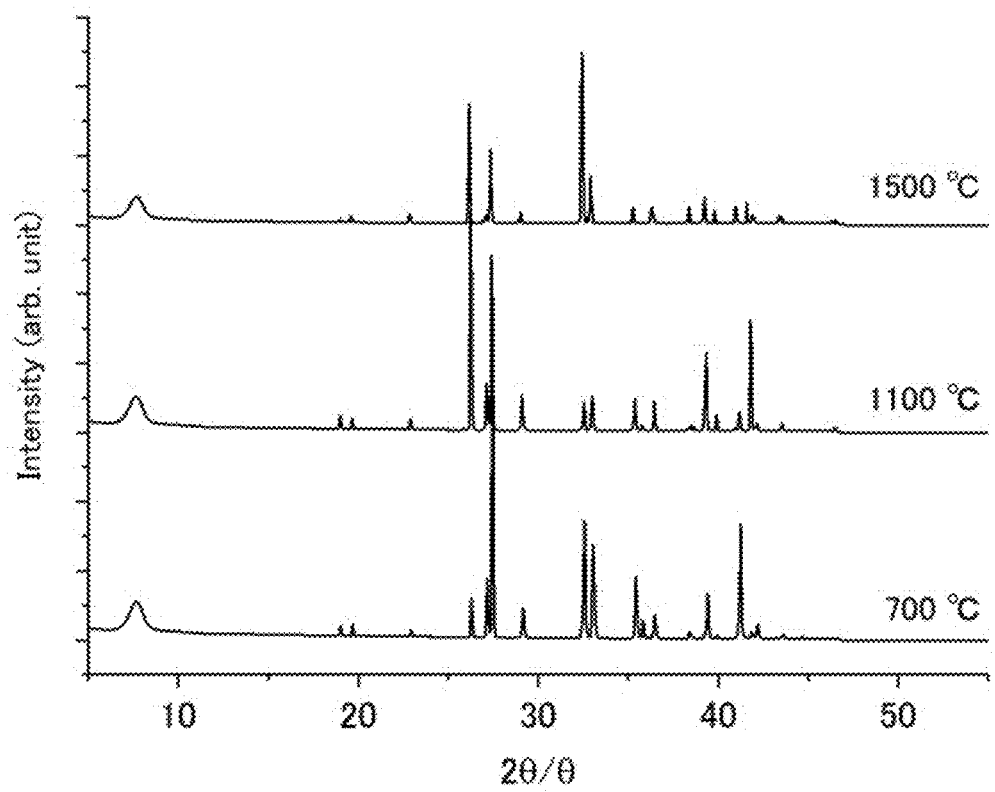
FIG. 8 is a graph showing XRD patterns of the sample, the sintered body of $Yb_2Si_2O_7$, at respective temperatures obtained by X-ray irradiation simultaneously to the acquisition of the XAFS spectra of FIG. 6.

FIG. 8 is a graph showing XRD patterns of the sample, the sintered body of $Yb_2Si_2O_7$, at respective temperatures obtained by X-ray irradiation simultaneously to the acquisition of the XAFS spectra of FIG. 6.

FIGS. 6 to 8 prove that it is possible to simultaneously measure X-ray diffraction and X-ray absorption fine structure of the sample in the same field of view (same position on the sample) at approximately 1500° C. using the cell for X-ray analysis 1 of the present invention. Naturally, it is possible to simultaneously measure XRD and XAFS in the same field of view when the temperature of the sample 20 is room temperature, or 1500° C. or higher within temperatures that the components of the cell for X-ray analysis 1 can withstand, as well.

Figure 9:
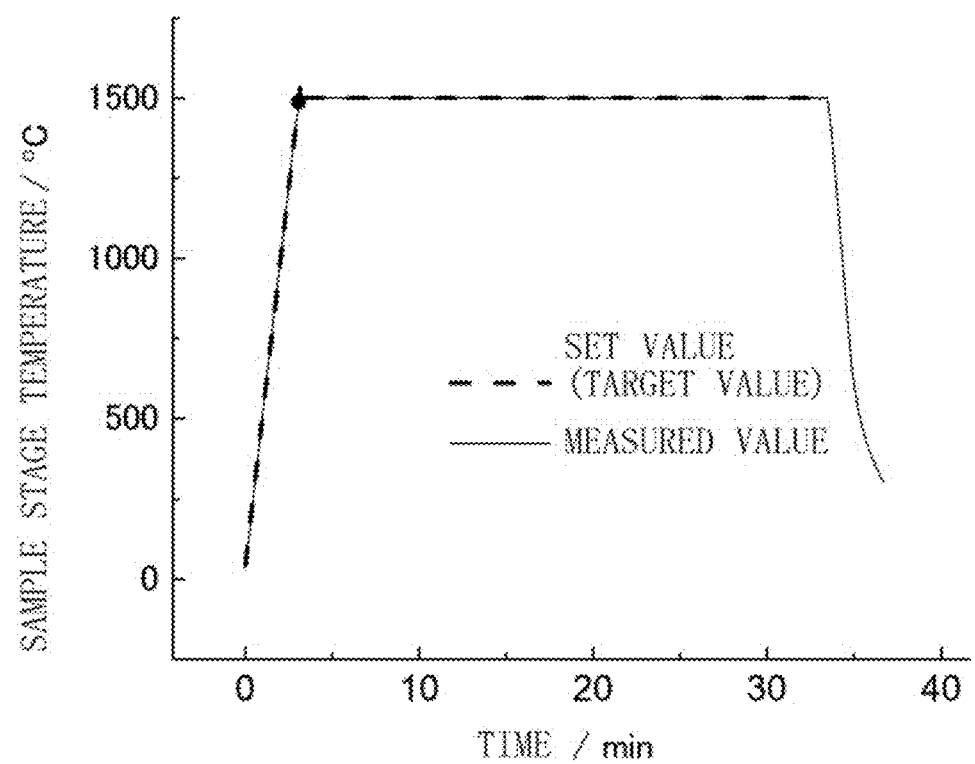
FIG. 9 is a graph showing a temperature rise curve of the sample at the simultaneous measurements of XRD and XAFS.

FIG. 9 is a graph showing a temperature rise curve of the sample at the simultaneous measurements of XRD and XAFS. The result shown in FIG. 9 reveals that the cell for X-ray analysis 1 of the present invention achieves practically sufficient temperature rise rate. Specifically, the sample can be heated from room temperature (25° C.) to 1500° C. at a rate of 500° C./min. Note that, in FIG. 9, elapsed time (min) is plotted on the horizontal axis, and sample temperature (° C.) on the stage is plotted on the vertical axis. The same applies to FIG. 10.

Figure 10:
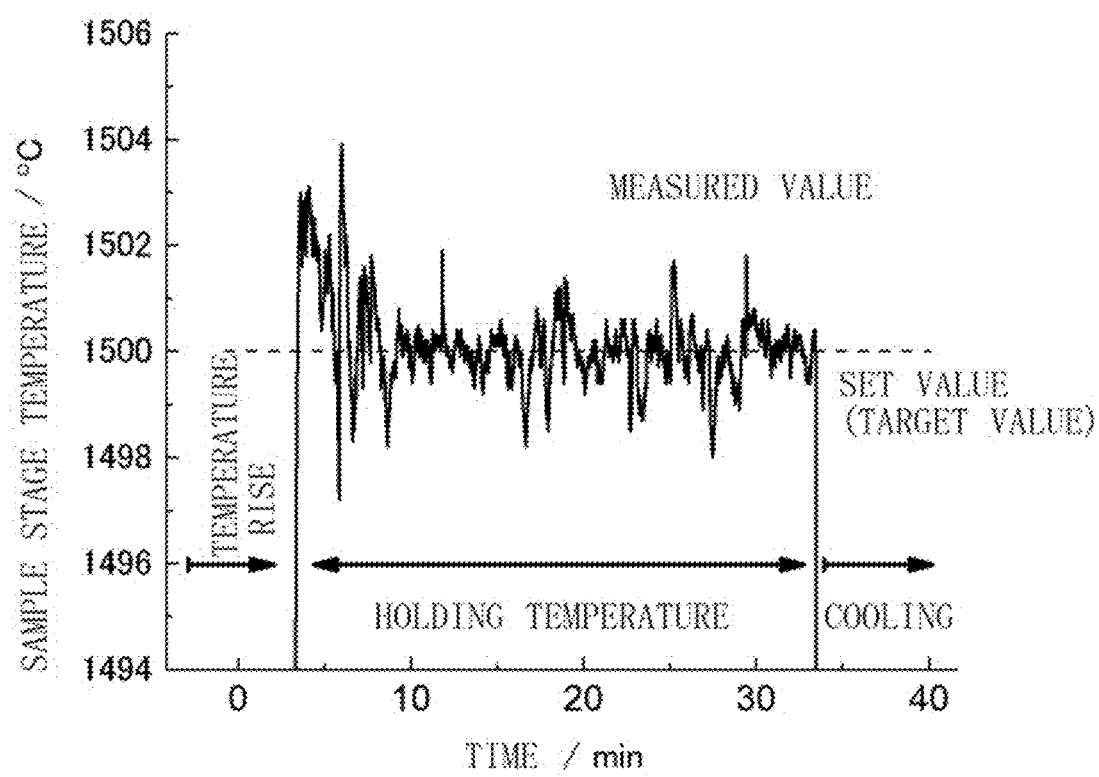
FIG. 10 is a graph showing temperature-holding characteristics of the cell for X-ray analysis of the present invention in a range of ultra-high temperature (around 1500° C.)

FIG. 10 is a graph showing temperature-holding characteristics of the cell for X-ray analysis 1 of the present invention in a range of ultra-high temperature (around 1500° C.). The result shown in FIG. 10 reveals that the sample temperature is held at set temperature with high accuracy. Specifically, the sample temperature can be held at a range of 1500±3.9° C. for 30 min after reaching the set temperature of 1500° C.

REFERENCE SIGNS LIST 1 cell for X-ray analysis
2 furnace
3 heating section
3a space
3b vessel
3c first base
3d second base
3e service port
3f mirror
4 focused heater
4a first heating device
4b second heating device
5 window holding section
5a first block
5b second block
5c through-hole
5d slit
5e channel
5f receiver
6 first window
7 second window
8 third window
9 optical axis
10 holder
10a stage
10b rod
10c adapter
10d O-ring
10e jig
10f packing
10g gland
10h screw 10i thermocouple
11 fluid injection portion
11a flow path
12 gas injection portion
12a through-hole
20 sample
30 X-ray analysis apparatus
40 X-ray diffraction detector
50 detector for X-ray absorption fine structure measurement

What is claimed is:

1. A cell for X-ray analysis that enables simultaneous X-ray diffraction and X-ray absorption fine structure measurements of a sample in the same field of view on the sample, the cell comprising:
    a furnace including a space where the sample is held and a focused heater heating the sample;
    a first window provided to the furnace and allowing passage of incident X-rays directed at the sample;
    a second window provided to the furnace and allowing passage of exiting X-rays emerging from the sample;
    a third window provided to the furnace; and
    a holder that positions the sample in the space,
    the cell enabling simultaneous measurements of the X-ray diffraction of the sample, at outside of the second window and the X-ray absorption fine structure of the sample, through the third window.

2. The cell for X-ray analysis according to claim 1, wherein the holder is insertable to and removable from the furnace.

3. The cell for X-ray analysis according to claim 1, wherein the furnace includes a flow path where a fluid for cooling the furnace flows.

4. The cell for X-ray analysis according to claim 1, comprising:
    a gas injection portion in communication with the space, for filling the space with gas or letting the gas to flow in the space; and
    a gas outlet for discharging the gas.

5. The cell for X-ray analysis according to claim 1, wherein the sample is heated at ultra-high temperature of 1000° C. or higher for measurement.

6. The cell for X-ray analysis according to claim 1, wherein the holder includes:
    a stage positioned in the space, for mounting the sample;
    a hollow rod connected to the stage;
    an adapter connected to the rod at side opposing the stage and fitted to the furnace; and
    a thermocouple arranged inside the rod and connected to the stage,
    the stage being rotatable together with the rod and acting as a hot junction point of the thermocouple.

7. The cell for X-ray analysis according to claim 1, wherein the space has a shape obtained by combining two spheroids in their rotation axis,
    the two spheroids each having two focal points on its rotation axis and sharing one focal point with one another,
    the space including on its inner surface a mirror that reflects infrared rays,
    the space, in which the sample is located at the shared focal point, and infrared lamps of a first heating device and a second heating device being the focused heater are located at another respective focal point which is not shared.

8. An X-ray analysis apparatus comprising:
    the cell for X-ray analysis according to claim 1;
    an X-ray diffraction detector; and
    a detector for X-ray absorption fine structure measurement;
    the apparatus simultaneously measuring X-ray diffraction and X-ray absorption fine structure.

* * * * *